No. 725,557. PATENTED APR. 14, 1903.
J. R. GOODWIN & W. C. BROWNE.
WATERING APPARATUS.
APPLICATION FILED APR. 21, 1902.
NO MODEL. 2 SHEETS—SHEET 2.
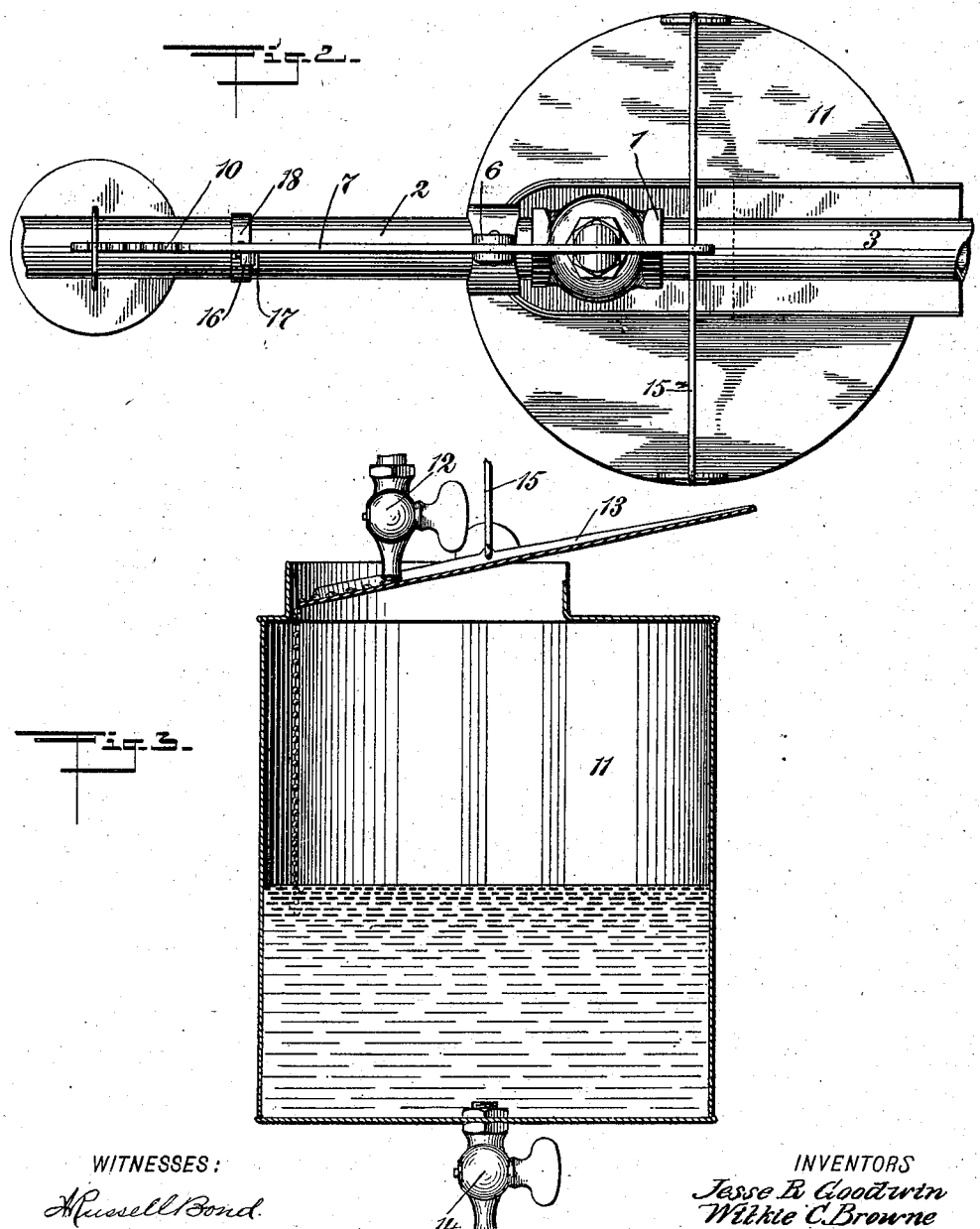
WITNESSES:
H. Russell Bond.
Walton Harrison.
INVENTORS
Jesse R. Goodwin
Wilkie C. Browne
BY
Munn & Co.
ATTORNEYS

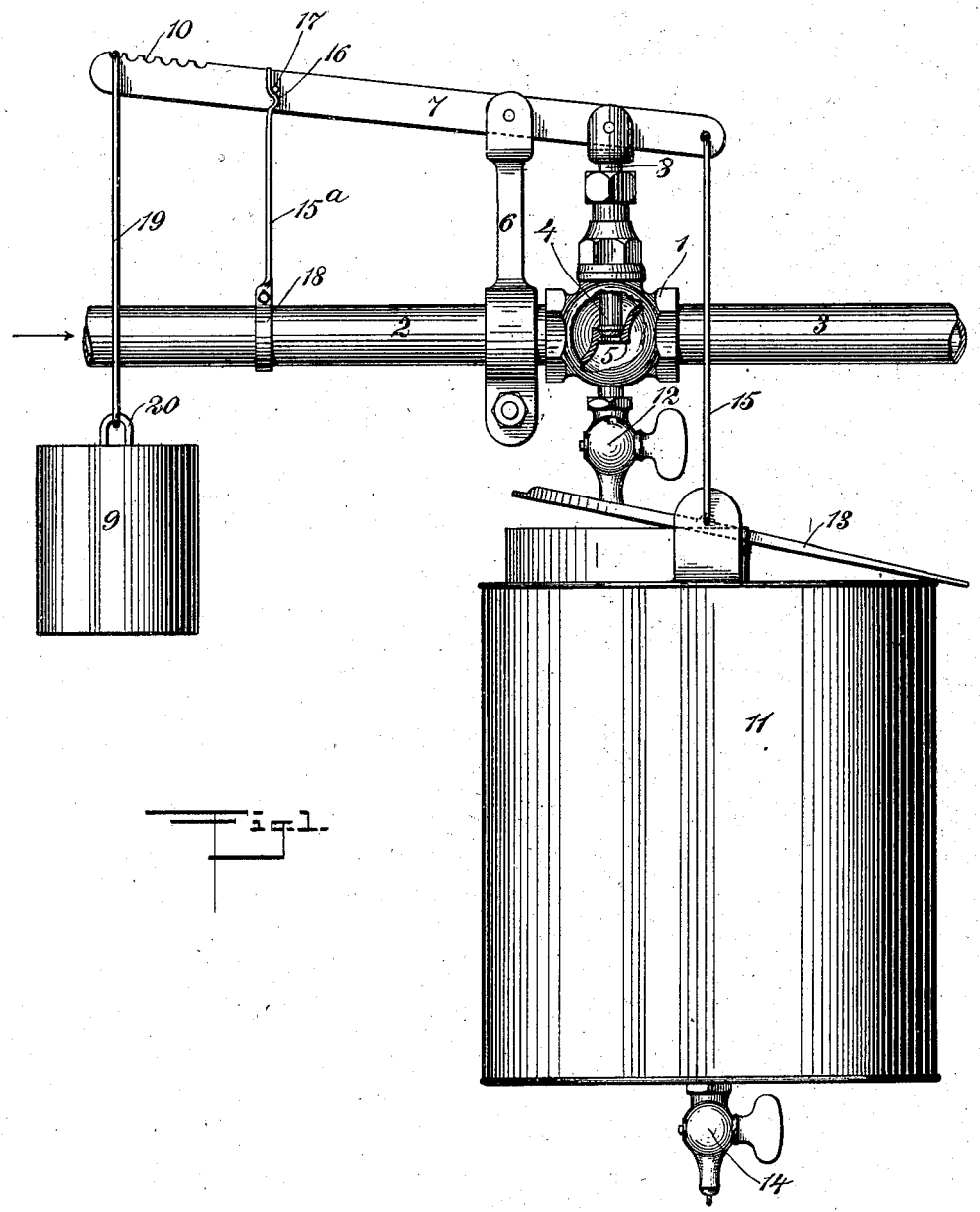

UNITED STATES PATENT OFFICE.

JESSE R. GOODWIN AND WILKIE C. BROWNE, OF SAVANNAH, GEORGIA.

WATERING APPARATUS.

SPECIFICATION forming part of Letters Patent No. 725,557, dated April 14, 1903.

Application filed April 21, 1902. Serial No. 103,940. (No model.)

*To all whom it may concern:*

Be it known that we, JESSE R. GOODWIN and WILKIE C. BROWNE, citizens of the United States, residing at Savannah, in the county of Chatham and State of Georgia, have invented certain new and useful Improvements in Watering Apparatus, of which the following is a full, clear, and exact description.

Our invention relates to watering apparatus which is particularly suitable for sprinkling flowers in cemeteries and vegetable-gardens.

Reference is to be had to the accompanying drawings, forming a part of this specification, in which similar characters of reference indicate corresponding parts in all the figures.

Figure 1 is a side elevation of the apparatus, showing certain details in section. Fig. 2 is a plan of the apparatus; and Fig. 3 is a fragmentary section of the tank and its accessories.

A hollow globular casing 1 is mounted upon a supply-pipe, consisting of tubular members 2 3, and is provided with a valve 4, adapted to rest upon a valve-seat 5. Upon a bracket 6 is pivoted a lever 7, and upon this lever is pivoted the valve-stem 8 for the valve 4. A weight 9 is suspended from this lever, the outer end of the lever being provided with notches 10 for the purpose of adjusting the position of said weight. A tank 11 is disposed immediately under the hand-valve 12, so that the latter is free to discharge into said tank. Over the tank and normally engaging the lower end of the hand-valve 12 is a trough 13, normally free to rock, as indicated in Figs. 1 and 3. Another hand-valve 14 is disposed at the bottom of the tank in order to regulate the discharge of water from the tank. The tank 11 is suspended by a link 15 from one end of the lever 7, so as to have a tendency to oppose the effect of the weight 9. The lever thus having the weight at one end and the tank at the other is normally free to teeter in the one direction or the other, according to the amount of water contained in the tank. A leaf-spring 15$^a$ is provided with a set-collar 18, secured upon the supply-pipe 2, and with a rounded bead 16, which engages either the upper or lower side of a boss on the lever 7, according to the position of the lever. The spring 15$^a$ has elasticity enough to hold the lever in a definite position until some little stress is placed upon the lever in a direction tending to bend the said spring to the left.

The member 3 of the supply-pipe is connected to a hose or to a sprinkler, such as is used periodically—say in watering flowers during one hour of each day.

Our invention is used as follows: Supposing the parts to be in the position indicated in Fig. 1, and that the tank 11 has about emptied its contents through the hand-valve 14, the tank being sufficiently lightened, the weight 9 causes the boss 17 to bend the spring 15$^a$, so that the boss 17 can pass the bead 16. The weight 9 now descends and the tank 11 ascends. The nozzle of the hand-valve 12 being in contact with the rocking trough 13, causes the latter to assume the position indicated in Fig. 3. At the same time the valve 4 is opened automatically. The member 3 of the supply-pipe now supplies water for the periodical sprinkling above referred to, and at the same time the hand-valve 12 discharges water into the tank 11. The hand-valve 12 can be so adjusted that the tank 11 will fill during the interval while the supply-pipe is used for sprinkling—say one hour. The tank 11 being filled with water, its weight is increased sufficiently to enable it to move the lever 7, which thereupon again assumes the position indicated in Fig. 1 and automatically closes the valve.

It may happen that some water remains in the tubular member 3, and this water is drained out by passing through the hand-valve 12 and running down the trough, so as not to cause the tank to overflow or disarrange the position of any part. From Fig. 1 it will be seen that this water is drained off to the right of the tank.

The general effect is that the device is entirely automatic, the tank filling itself every day and turning on the water of the supply-pipe for a predetermined period, so that the water may be used elsewhere. The tank 11 thus acts not only as a motor for automatically turning the water on and off for some other part of the premises, but may itself act as a watering apparatus for plants which may be in its immediate vicinity.

The apparatus may be so used as to water a lot or a garden once a day or oftener, as desired.

Having thus described our invention, we claim as new and desire to secure by Letters Patent—

1. A watering apparatus, comprising a supply-pipe provided with an automatic valve for closing the same, and with a depending hand-valve for permitting water to escape from said pipe, a lever for operating said automatic valve, a receptacle connected with said lever and normally free to move relatively to said hand-valve, a rocking trough mounted upon said receptacle and normally engaging said depending hand-valve, and means for emptying said receptacle, the arrangement being such that said rocking trough diverts the water into and out of said receptacle, according to the position occupied by said receptacle.

2. A watering apparatus, comprising a supply-pipe provided with automatic valves and a hand-valve, a bracket mounted upon said supply-pipe adjacent to said automatic valve, a lever pivotally balanced upon said bracket and connected with said automatic valve for operating the same, said lever being provided with a boss, a spring member mounted upon said supply-pipe and provided with a bead for engaging said boss, a weight adjustably mounted upon one end of said member, a receptacle mounted upon the other end thereof, said receptacle being provided with a discharge-valve, and means controllable automatically by movements of the lever for diverting water from the hand-valve into and out of said receptacle.

In testimony whereof we have signed our names to this specification in the presence of the subscribing witnesses.

JESSE R. GOODWIN.
WILKIE C. BROWNE.

Witnesses:
DANIEL O'DONOVAN,
WM. H. TRUEHEART, Sr.,
THOS. S. HILL.